(12) United States Patent　　　(10) Patent No.:　US 12,647,832 B2

Horn et al.　　　　　　　　　　　　(45) Date of Patent:　　Jun. 2, 2026

---

(54) USER EQUIPMENT BANDWIDTH REPORTING

(71) Applicant: QUALCOMM Incorporated, San Diego, CA (US)

(72) Inventors: Idan Michael Horn, Hod Hasharon (IL); Shay Landis, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 17/804,741

(22) Filed: May 31, 2022

(65) Prior Publication Data

US 2023/0388861 A1　　Nov. 30, 2023

(51) Int. Cl.
| | |
|---|---|
| *H04W 28/20* | (2009.01) |
| *H04W 28/02* | (2009.01) |
| *H04W 28/082* | (2023.01) |
| *H04W 76/10* | (2018.01) |

(52) U.S. Cl.
CPC ....... *H04W 28/20* (2013.01); *H04W 28/0231* (2013.01); *H04W 28/082* (2023.05); *H04W 76/10* (2018.02)

(58) Field of Classification Search
CPC ............. H04W 28/20; H04W 28/0231; H04W 28/082; H04W 76/10; H04W 72/51
USPC ........................................................ 370/229
See application file for complete search history.

(56) References Cited

U.S. PATENT DOCUMENTS

| | | | | |
|---|---|---|---|---|
| 2008/0112358 A1* | 5/2008 | Bennett | ............... | H04W 72/541 |
| | | | | 370/329 |
| 2011/0003609 A1* | 1/2011 | Sundstrom | ........ | H04W 52/0206 |
| | | | | 455/509 |
| 2011/0222499 A1* | 9/2011 | Park | ...................... | H04W 72/21 |
| | | | | 370/329 |
| 2011/0261781 A1* | 10/2011 | Vrzic | .................. | H04L 27/2602 |
| | | | | 370/329 |
| 2012/0307748 A1* | 12/2012 | Cheng | ................... | H04L 5/0053 |
| | | | | 370/329 |
| 2018/0235025 A1* | 8/2018 | Chen | ........................ | H04W 4/20 |
| 2018/0302918 A1* | 10/2018 | Shaheen | ............... | H04W 76/27 |
| 2018/0310338 A1* | 10/2018 | Li | ......................... | H04L 5/0094 |
| 2020/0053811 A1* | 2/2020 | Ang | .................... | H04L 27/2666 |

* cited by examiner

*Primary Examiner* — Obaidul Huq

(74) *Attorney, Agent, or Firm* — Harrity & Harrity LLP

(57)　　　　　　　　ABSTRACT

Various aspects of the present disclosure generally relate to wireless communication. In some aspects, a user equipment (UE) may transmit, to a network node, an indication of a first bandwidth requested to be used for communications between the UE and the network node, the first bandwidth being based at least in part on a parameter associated with the UE, and the parameter being based at least in part on one or more channel conditions. The UE may receive, from the network node, an indication that the first bandwidth or a second bandwidth is to be used for the communications between the UE and the network node. Numerous other aspects are provided.

30 Claims, 9 Drawing Sheets

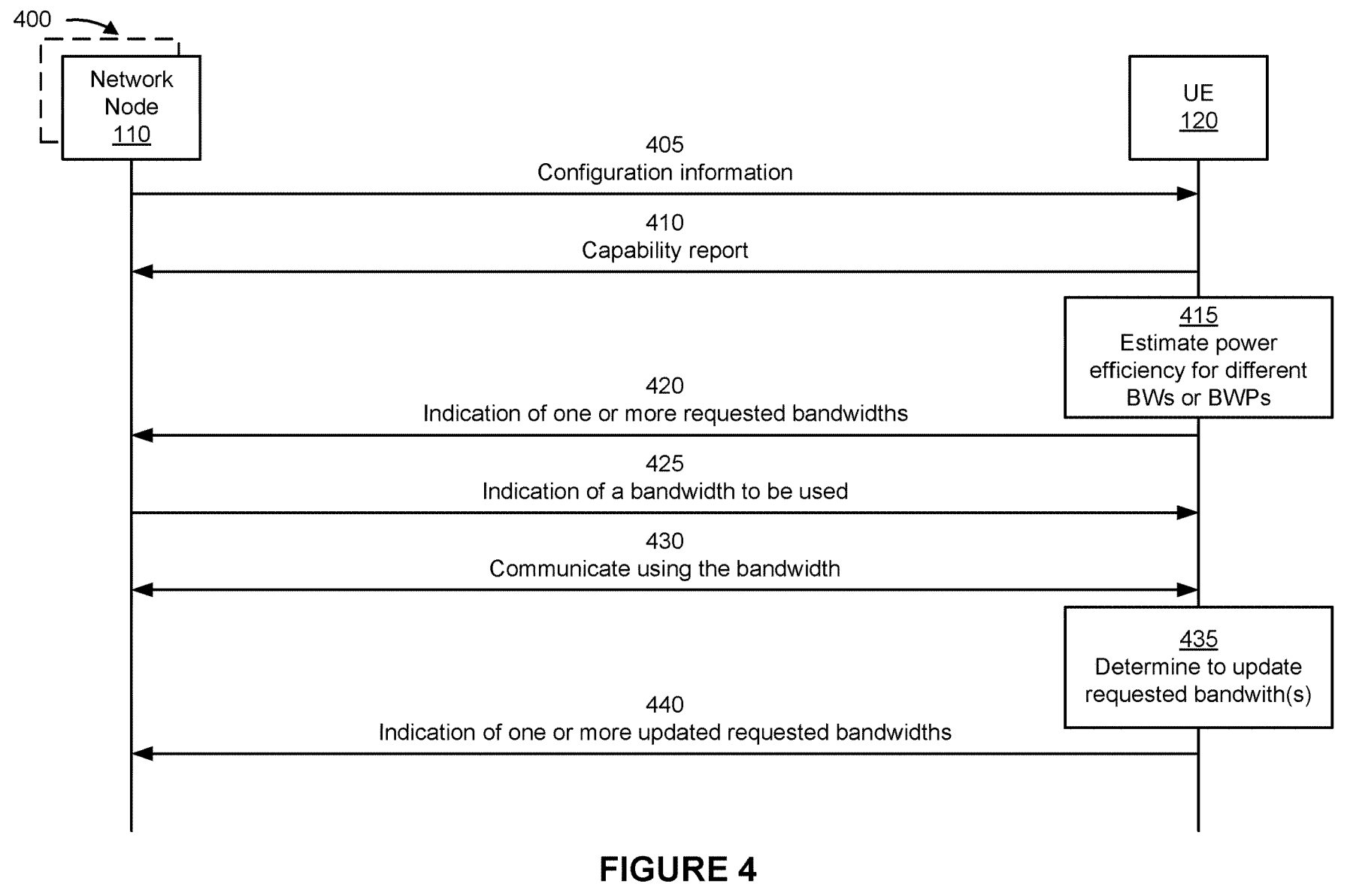

UE
120

415
Estimate power efficiency for different BWs or BWPs

435
Determine to update requested bandwith(s)

Network Node 110

400

405
Configuration information

410
Capability report

420
Indication of one or more requested bandwidths

425
Indication of a bandwidth to be used

430
Communicate using the bandwidth

440
Indication of one or more updated requested bandwidths

FIGURE 4

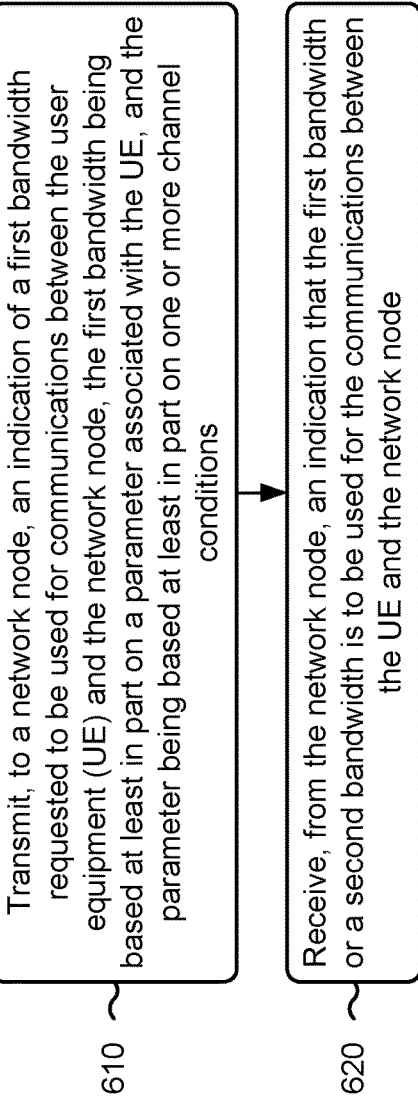

610  Transmit, to a network node, an indication of a first bandwidth requested to be used for communications between the user equipment (UE) and the network node, the first bandwidth being based at least in part on a parameter associated with the UE, and the parameter being based at least in part on one or more channel conditions 620  Receive, from the network node, an indication that the first bandwidth or a second bandwidth is to be used for the communications between the UE and the network node

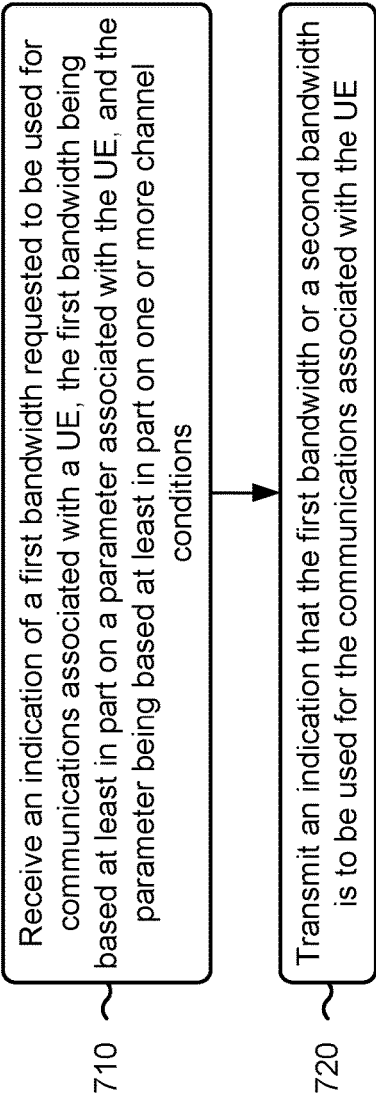

710 Receive an indication of a first bandwidth requested to be used for communications associated with a UE, the first bandwidth being based at least in part on a parameter associated with the UE, and the parameter being based at least in part on one or more channel conditions 720 Transmit an indication that the first bandwidth or a second bandwidth is to be used for the communications associated with the UE

USER EQUIPMENT BANDWIDTH REPORTING

FIELD OF THE DISCLOSURE

Aspects of the present disclosure generally relate to wireless communication and specifically, to techniques and apparatuses for user equipment (UE) bandwidth reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some cases, a user equipment (UE) and a network node may communicate using high frequency bands. The high frequency bands may sometimes be referred to as a sub-terahertz (THz) frequency band. "Sub-THz frequency band" may refer to frequency bands in the range from 100 GHz to 300 GHz, among other examples. The high frequency bands (for example, the sub-THz band) may be associated with one or more benefits, such as increased data rates, improved radio performance, increased throughput, or increased reliability, among other examples. For example, the UE and the network node may communicate using a larger bandwidth size, such as a 7.5 gigahertz (GHz) bandwidth, among other examples. Communicating using the larger bandwidth size may result an increased throughput for communications between the UE and the network node. Radio frequency (RF) constraints and propagation properties that are unique to the high frequency bands may introduce new design challenges for cellular networks. For example, the high frequency bands may be associated with a high path loss. Therefore, to compensate for the high path loss, the network node and the UE may communicate using narrow beams (for example, beams with a narrow beam width or signals with energy concentrated over a narrow directional range).

To communicate using higher bands, the UE or the network node may be associated with an increased density of antenna elements per antenna group based at least in part on distances between antenna elements being associated with a wavelength of a signal to be transmitted or received. Based at least in part on an increased density of antenna elements per antenna group, the UE or the network node may have an increased quantity of power amplifiers. Additionally, power consumption of the analog and digital RF components of the UE (such as a decoder, an analog-to-digital converter (ADC), a power amplifier, or a low noise amplifier, among other examples) increases when communicating using the high frequency bands, such as the sub-THz band. As a result, the UE may consume additional power and a battery life associated with the UE may be decreased or shortened (for example, as compared to communicating using lower frequency bands).

Another difficulty associated with the higher frequency bands is associated with a varying channel energy or power experienced by a UE as frequency or channel conditions change. For example, when communicating using the high frequency bands, such as the sub-THz band, an energy or power associated with a channel may change based at least in part on one or more channel conditions, such as signal-to-interference-plus-noise ratio (SINR), or integrated phase noise (IPN), among other examples. Additionally, over a large bandwidth used for the high frequency bands, an achievable power for a channel may vary or ripple (for example, plus or minus 10 decibels (dBs)). Using a single code rate to process signals over the entire bandwidth may reduce an achievable spectral efficiency due to the variance or rippling in the frequency domain response associated with the channel.

As a result, to improve a power efficiency of a UE, a network node may adapt one or more link parameters to attempt to optimize the power efficiency of the UE and the spectral efficiency of the channel. As used herein, "power efficiency" may refer to an amount of power used by a device (for example, a UE) to communicate (for example, transmit or receive) an amount or size of data. For example, power efficiency may be measured in a unit of gigabit per joule or gigabits per second (Gbps) per watt, among other examples. For example, as a size of a bandwidth used by a UE decreases, SINR may increase. This may affect power consumption by the UE and the throughput of a channel. However, the change in power consumption and a change in the throughput may be different as channel conditions, such as SINR, change. For example, a first bandwidth size may be associated with a highest power efficiency under first channel conditions and a second bandwidth size may be associated with a highest power efficiency under second channel conditions. As another example, although a given bandwidth may be associated with a higher throughput (for example, may be associated with communicating more data due to a larger bandwidth size), the given bandwidth may be associated with a lower power efficiency of a UE than another bandwidth that is associated with a lower throughput. However, a network node may not know power consumption information associated with a given UE. As a result, the network node may configure the UE to communicate using a bandwidth that results in a lower power efficiency of the UE. Because the higher frequency bands are associated with higher power consumption by the UE, the lower power efficiency of the UE may result in the UE consuming additional power to communicate an amount data, thereby resulting in a degraded battery life of the UE.

SUMMARY

Some aspects described herein relate to a user equipment (UE) for wireless communication. The UE may include at least one memory and at least one processor, communicatively coupled with the at least one memory. The at least one processor may be configured to cause the UE to transmit, to a network node, an indication of a first bandwidth requested to be used for communications between the UE and the network node, the first bandwidth being based at least in part on a parameter associated with the UE, and the parameter being based at least in part on one or more channel conditions. The at least one processor may be configured to cause the UE to receive, from the network node, an indication that the first bandwidth or a second bandwidth is to be used for the communications between the UE and the network node.

Some aspects described herein relate to a network node for wireless communication. The network node may include at least one memory and at least one processor communicatively coupled with the at least one memory. The at least one processor may be configured to cause the network node to receive an indication of a first bandwidth requested to be used for communications associated with a UE, the first bandwidth being based at least in part on a parameter associated with the UE, and the parameter being based at least in part on one or more channel conditions. The at least one processor may be configured to cause the network node to transmit an indication that the first bandwidth or a second bandwidth is to be used for the communications associated with the UE.

Some aspects described herein relate to a method of wireless communication performed by a UE. The method may include transmitting, to a network node, an indication of a first bandwidth requested to be used for communications between the UE and the network node, the first bandwidth being based at least in part on a parameter associated with the UE, and the parameter being based at least in part on one or more channel conditions. The method may include receiving, from the network node, an indication that the first bandwidth or a second bandwidth is to be used for the communications between the UE and the network node.

Some aspects described herein relate to a method of wireless communication performed by a network node. The method may include receiving an indication of a first bandwidth requested to be used for communications associated with a UE, the first bandwidth being based at least in part on a parameter associated with the UE, and the parameter being based at least in part on one or more channel conditions. The method may include transmitting an indication that the first bandwidth or a second bandwidth is to be used for the communications associated with the UE.

Some aspects described herein relate to a non-transitory computer-readable medium that stores a set of instructions for wireless communication by a UE. The set of instructions, when executed by one or more processors of the UE, may cause the UE to transmit, to a network node, an indication of a first bandwidth requested to be used for communications between the UE and the network node, the first bandwidth being based at least in part on a parameter associated with the UE, and the parameter being based at least in part on one or more channel conditions. The set of instructions, when executed by one or more processors of the UE, may cause the UE to receive, from the network node, an indication that the first bandwidth or a second bandwidth is to be used for the communications between the UE and the network node.

Some aspects described herein relate to a non-transitory computer-readable medium that stores a set of instructions for wireless communication by a network node. The set of instructions, when executed by one or more processors of the network node, may cause the network node to receive an indication of a first bandwidth requested to be used for communications associated with a UE, the first bandwidth being based at least in part on a parameter associated with the UE, and the parameter being based at least in part on one or more channel conditions. The set of instructions, when executed by one or more processors of the network node, may cause the network node to transmit an indication that the first bandwidth or a second bandwidth is to be used for the communications associated with the UE.

Some aspects described herein relate to an apparatus for wireless communication. The apparatus may include means for transmitting, to a network node, an indication of a first bandwidth requested to be used for communications between the apparatus and the network node, the first bandwidth being based at least in part on a parameter associated with the apparatus, and the parameter being based at least in part on one or more channel conditions. The apparatus may include means for receiving, from the network node, an indication that the first bandwidth or a second bandwidth is to be used for the communications between the apparatus and the network node.

Some aspects described herein relate to an apparatus for wireless communication. The apparatus may include means for receiving an indication of a first bandwidth requested to be used for communications associated with a UE, the first bandwidth being based at least in part on a parameter associated with the UE, and the parameter being based at least in part on one or more channel conditions. The apparatus may include means for transmitting an indication that the first bandwidth or a second bandwidth is to be used for the communications associated with the UE.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 4 is a diagram of an example associated with UE bandwidth reporting in accordance with the present disclosure.

FIG. 6 is a flowchart illustrating an example process performed, for example, by a UE, associated with UE bandwidth reporting in accordance with the present disclosure.

FIG. 7 is a flowchart illustrating an example process performed, for example, by a network node, associated with UE bandwidth reporting in accordance with the present disclosure.

DETAILED DESCRIPTION

Figure 1:
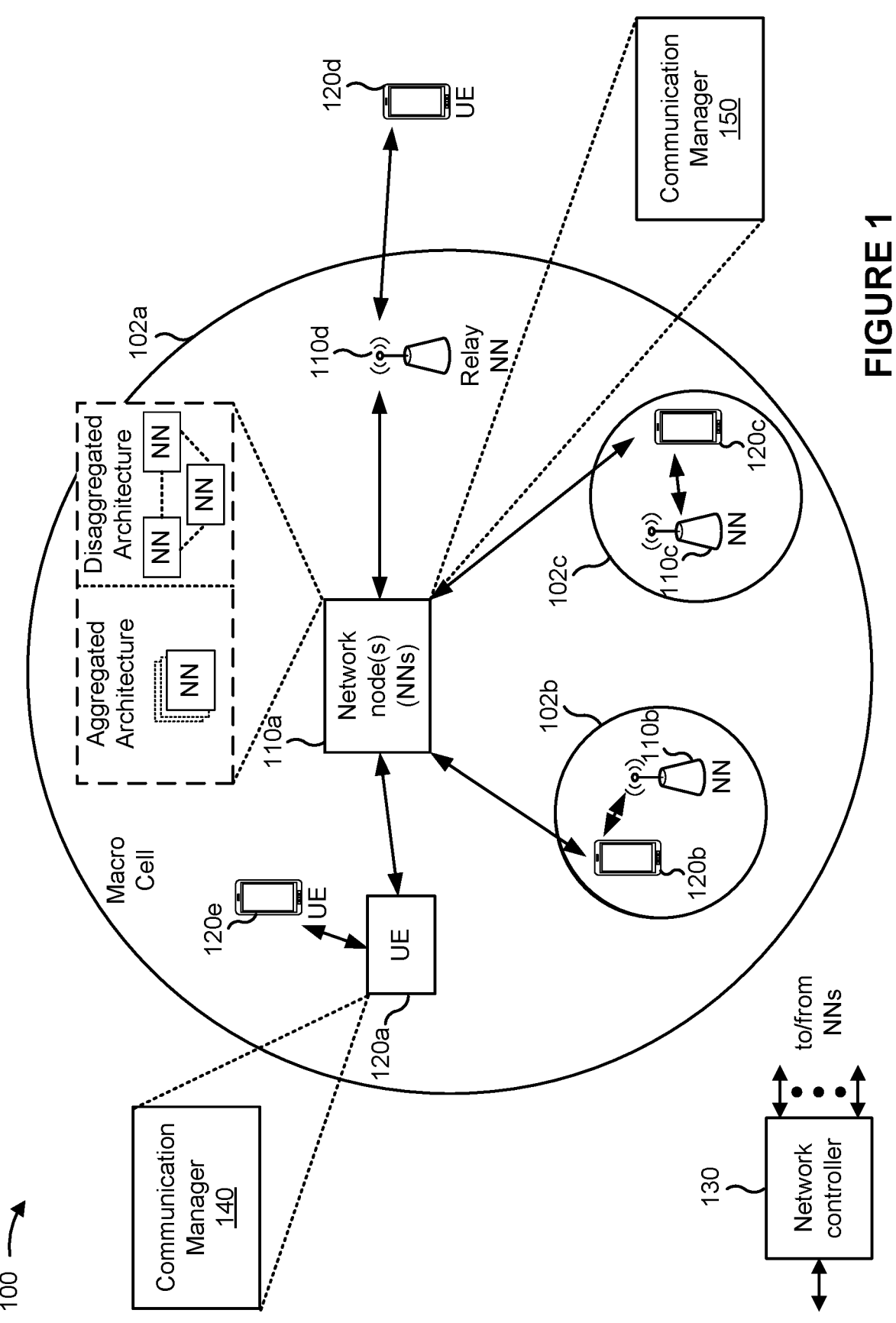
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to user equipment (UE) bandwidth reporting. Some aspects more specifically relate to a UE transmitting, to a network node, an indication of a bandwidth to be used by the UE, to optimize power efficiency of the UE or a spectral efficiency. In some aspects, the UE may transmit an indication of a first bandwidth requested to be used for communications associated with the UE, the first bandwidth being based at least in part on a parameter (for example, an estimated power efficiency of the UE or a spectral efficiency, among other examples) associated with the UE, and the parameter being based at least in part on one or more channel conditions. A network node may receive an indication of the first bandwidth and may configure the UE to use the requested bandwidth or another bandwidth (for example, the network node may accept or reject the request of the UE to use the first bandwidth). In other words, the network node may consider the first bandwidth requested by the UE when configuring a bandwidth that is to be used by the UE.

For example, a UE report of a desired bandwidth, or bandwidth part (BWP), may be defined. The UE may dynamically update a report of the bandwidth that is requested to be used for communications associated with the UE. For example, as channel conditions change or an estimated power efficiency of the UE changes, the UE may transmit an updated bandwidth that is requested to be used for communications associated with the UE.

Particular aspects of the subject matter described in this disclosure can be implemented to realize one or more of the following potential advantages. In some examples, the described techniques can be used to improve a power efficiency of the UE. For example, by reporting the requested bandwidth (for example, that is associated with a highest power efficiency of the UE), the UE may be configured with a bandwidth that results in improved power efficiency of the UE. Additionally, the described techniques can be used to improve spectral efficiency of communications between the UE and a network node because the UE may be configured with a larger bandwidth size (for example, resulting in improved throughput and increased spectral efficiency) while also ensuring that a power efficiency of the UE is optimized.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges. In some examples, devices of the wireless network 100 may communicate using bands associated with frequencies higher than the millimeter wave band. For example, devices may communicate using a sub-terahertz (sub-THz) band, which may include frequencies that are multiple hundreds of GHz (such as 100 GHz-300 GHz).

In some aspects, the UE 120 may include a communication manager 140. As described in more detail elsewhere herein, the communication manager 140 may transmit, to a network node, an indication of a first bandwidth requested to be used for communications between the UE and the network node, the first bandwidth being based at least in part on a parameter associated with the UE, and the parameter being based at least in part on one or more channel conditions; and receive, from the network node, an indication that the first bandwidth or a second bandwidth is to be used for the communications between the UE and the network node. Additionally or alternatively, the communication manager 140 may perform one or more other operations described herein.

In some aspects, the network node 110 may include a communication manager 150. As described in more detail elsewhere herein, the communication manager 150 may receive an indication of a first bandwidth requested to be used for communications associated with a UE, the first bandwidth being based at least in part on a parameter associated with the UE, and the parameter being based at least in part on one or more channel conditions; and transmit an indication that the first bandwidth or a second bandwidth is to be used for the communications associated with the UE. Additionally or alternatively, the communication manager 150 may perform one or more other operations described herein.

Figure 2:
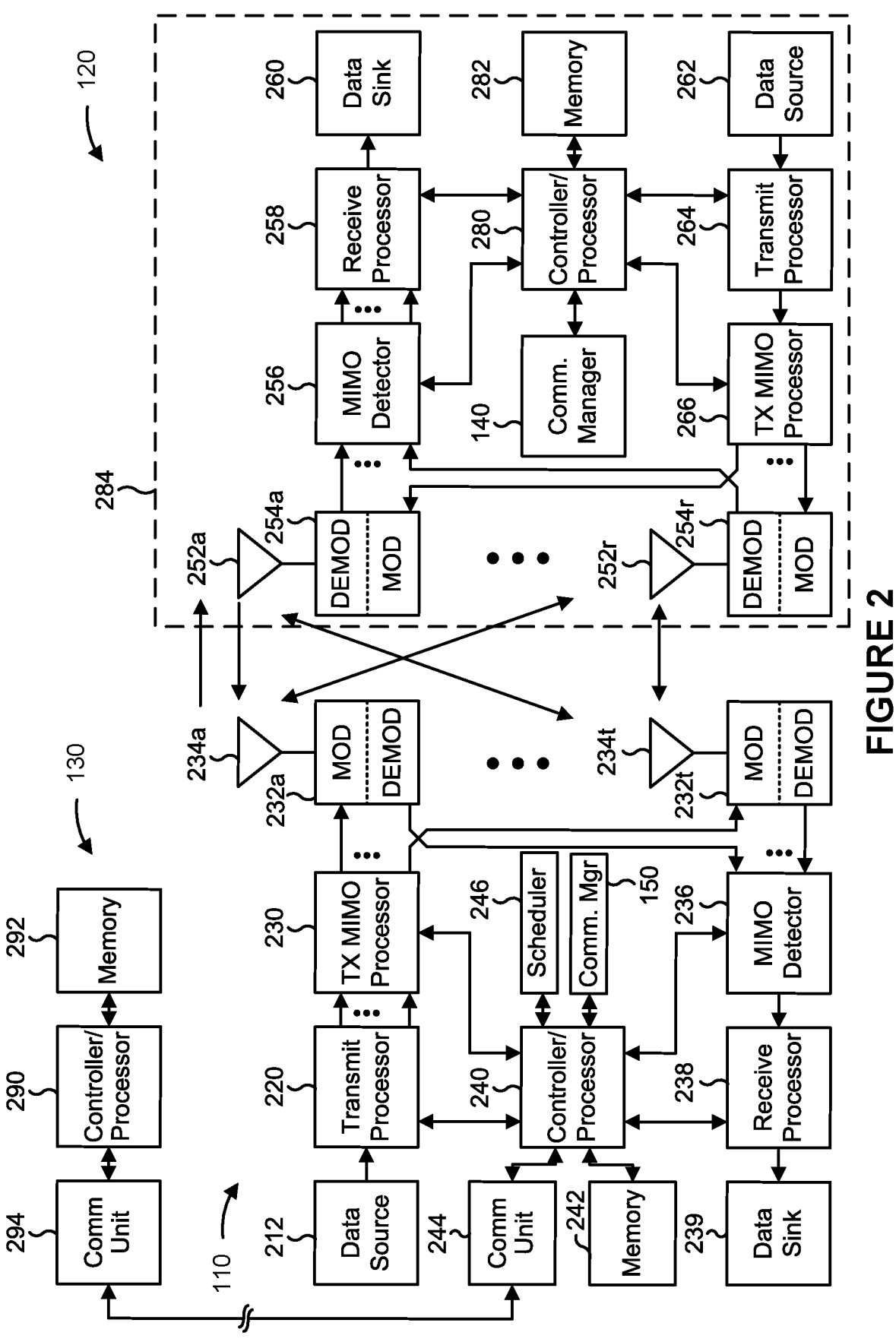
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with UE bandwidth reporting, as described in more detail elsewhere herein. For example, the controller/processor 240 of the network node 110, the controller/processor 280 of the UE 120, or any other component(s) of FIG. 2 may perform or direct operations of, for example, process 600 of FIG. 6, process 700 of FIG. 7, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, process 700 of FIG. 7, or other processes as described herein. In some examples, executing instructions may include running the instructions, converting the instructions, compiling the instructions, or interpreting the instructions, among other examples.

In some aspects, the UE 120 includes means for transmitting, to a network node, an indication of a first bandwidth requested to be used for communications between the UE and the network node, the first bandwidth being based at least in part on a parameter associated with the UE, and the parameter being based at least in part on one or more channel conditions; or means for receiving, from the network node, an indication that the first bandwidth or a second bandwidth is to be used for the communications between the UE and the network node. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving an indication of a first bandwidth requested to be used for communications associated with a UE, the first bandwidth being based at least in part on a parameter associated with the UE, and the parameter being based at least in part on one or more channel conditions; or means for transmitting an indication that the first bandwidth or a second bandwidth is to be used for the communications associated with the UE. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
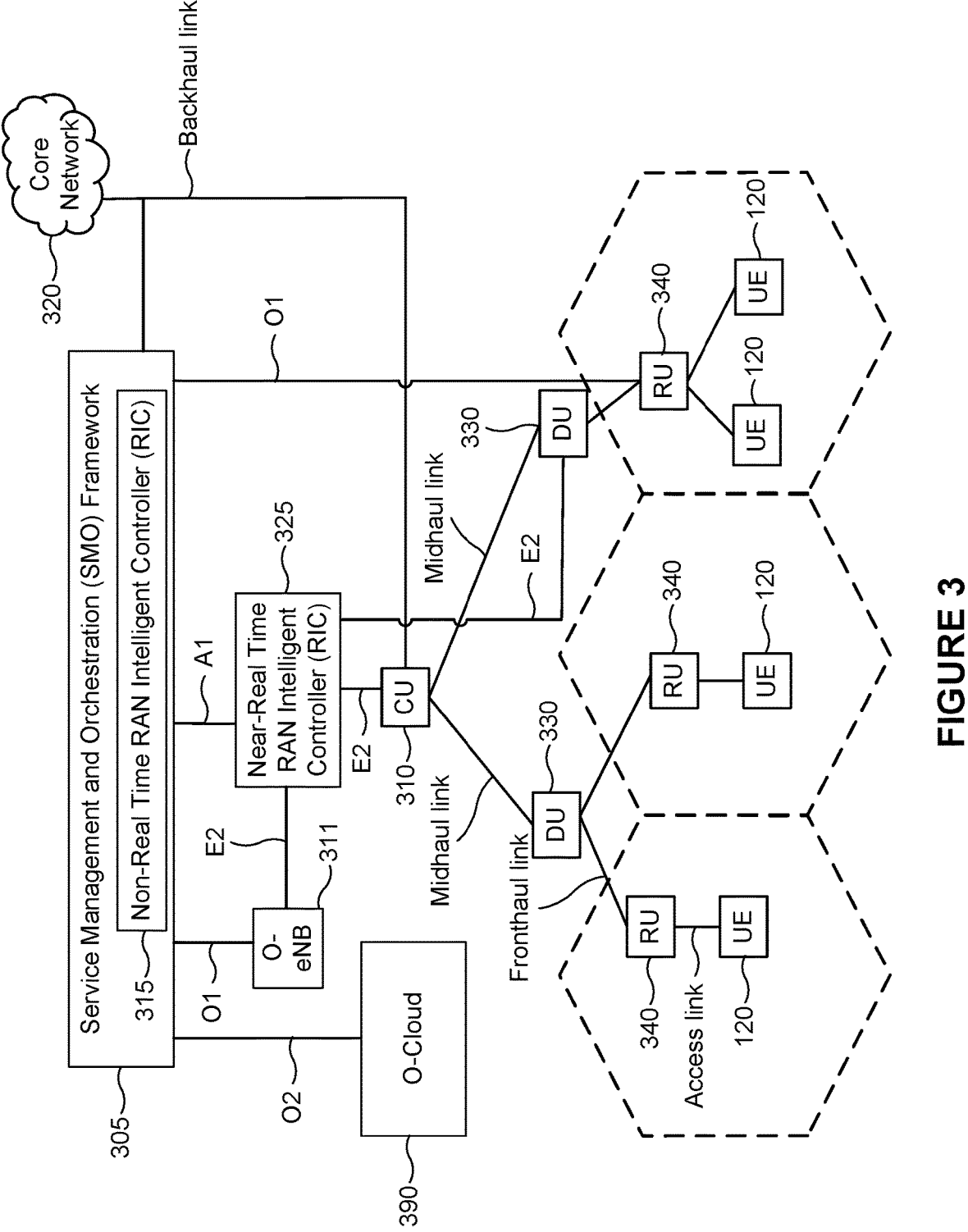
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or informa- tion (collectively, signals) via a wired or wireless transmis- sion medium. Each of the units, or an associated processor or controller providing instructions to one or multiple com- munication interfaces of the respective unit, can be config- ured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data conver- gence protocol (PDCP) functions, or service data adaptation protocol (SDAP) functions, among other examples. Each control function can be implemented with an interface configured to communicate signals with other control func- tions hosted by the CU 310. The CU 310 may be configured to handle user plane functionality (for example, Central Unit-User Plane (CU-UP) functionality), control plane func- tionality (for example, Central Unit-Control Plane (CU-CP) functionality), or a combination thereof. In some implemen- tations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamform- ing, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real- time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 inter- face). For virtualized network elements, the SMO Frame- work 305 may be configured to interact with a cloud computing platform (such as an open cloud (O-Cloud) platform 390) to perform network element life cycle man- agement (such as to instantiate virtualized network ele- ments) via a cloud computing platform interface (such as an O2 interface). Such virtualized network elements can include, but are not limited to, CUs 310, DUs 330, RUs 340, non-RT RICs 315, and Near-RT RICs 325. In some imple- mentations, the SMO Framework 305 can communicate with a hardware aspect of a 4G RAN, such as an open eNB (O-eNB) 311, via an O1 interface. Additionally, in some implementations, the SMO Framework 305 can communi- cate directly with each of one or more RUs 340 via a respective O1 interface. The SMO Framework 305 also may include a Non-RT RIC 315 configured to support function- ality of the SMO Framework 305.

The Non-RT MC 315 may be configured to include a logical function that enables non-real-time control and opti- mization of RAN elements and resources, Artificial Intelli- gence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Frame- work 305 or the Non-RT RIC 315 from non-network data sources or from network functions. In some examples, the Non-RT RIC 315 or the Near-RT RIC 325 may be config- ured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

In some cases, a UE 120 and a network node 110 may communicate using high frequency bands. For example, the UE 120 and the network node 110 may communicate using millimeter wave bands, the EHF band, FR3, FR4, FR4-a, FR4-1, FR5, or frequency bands associated with higher frequencies (for example, higher than FR5 or other bands mentioned above). The high frequency bands may sometimes be referred to as sub-terahertz (THz) frequency bands. "Sub-THz frequency band" may refer to frequency bands in the range from 100 GHz to 300 GHz, among other examples. The high frequency bands (for example, the sub-THz band) may be associated with one or more benefits, such as increased data rates, improved radio performance, increased throughput, or increased reliability, among other examples. For example, the UE 120 and the network node 110 may communicate using a larger bandwidth size, such as a 7.5 GHz bandwidth, among other examples. Communicating using the larger bandwidth size may result an increased throughput for communications between the UE 120 and the network node 110.

RF constraints and propagation properties that are unique to the high frequency bands may introduce new design challenges for cellular networks. For example, the high frequency bands may be associated with a high path loss. Therefore, to compensate for the high path loss, the network node 110 and the UE 120 may communicate using narrow beams (for example, beams with a narrow beam width or signals with energy concentrated over a narrow directional range). In such examples, spatial division multiplexing (SDM) may be used (for example, where different, spatially separable antenna beams are formed for different UEs).

To communicate using higher bands, the UE 120 or the network node 110 may have an increased density of antenna elements per antenna group based at least in part on distances between antenna elements being associated with a wavelength of a signal to be transmitted or received. Based at least in part on an increased density of antenna elements per antenna group, the UE 120 or the network node 110 may have an increased quantity of power amplifiers. The power amplifiers may have lower power efficiency based at least in part on transmitting in a higher frequency band, which may consume additional power resources of the transmitter device. To improve power efficiency, the UE 120 or the network node 110 may transmit with a power that is near saturation levels of the power amplifiers. However, transmitting with the power that is near saturation levels may cause power amplifier compression or power amplifier nonlinearity. Additionally power consumption of the analog and digital RF components of the UE 120 (such as a decoder, an analog-to-digital converter (ADC), a power amplifier, or a low noise amplifier, among other examples) increases when communicating using the high frequency bands, such as the sub-THz band. As a result, the UE 120 may consume additional power and a battery life associated with the UE 120 may be decreased or shortened (for example, as compared to communicating using lower frequency bands).

Another difficulty associated with the higher frequency bands is associated with a varying channel energy or power experienced by a UE 120 as frequency or channel conditions change. For example, when communicating using the high frequency bands, such as the sub-THz band, an energy or power associated with a channel may change based at least in part on one or more channel conditions, such as signal-to-interference-plus-noise ratio (SINR), or integrated phase noise (IPN), among other examples. Additionally, over a large bandwidth used for the high frequency bands, an achievable power for a channel may vary or ripple (for example, plus or minus 10 decibels (dBs)). Using a single code rate to process signals over the entire bandwidth may reduce an achievable spectral efficiency due to the variance or rippling in the frequency domain response associated with the channel.

As a result, to improve a power efficiency of a UE 120, a network node may adapt one or more link parameters to attempt to optimize the power efficiency of the UE 120 and the spectral efficiency of the channel. As used herein, "power efficiency" may refer to an amount of power used by a device (for example, a UE 120) to communicate (for example, transmit or receive) an amount or size of data. For example, power efficiency may be measured in a unit of gigabit per joule or gigabits per second (Gbps) per watt, among other examples. For example, as a size of a bandwidth used by a UE 120 decreases, SINR may increase. This may affect power consumption by the UE 120 and the throughput of a channel. However, the change in power consumption and a change in the throughput may be different as channel conditions, such as SINR, change. For example, a first bandwidth size may be associated with a highest power efficiency under first channel conditions, and a first bandwidth size may be associated with a highest power efficiency under second channel conditions. As another example, although a given bandwidth may be associated with a higher throughput (for example, may be associated with communicating more data due to a larger bandwidth size), the given bandwidth may be associated with a lower power efficiency of a UE 120 than another bandwidth that is associated with a lower throughput. However, a network node 110 may not know power consumption information associated with a given UE 120. As a result, the network node 110 may configure the UE 120 to communicate using a bandwidth that results in a lower power efficiency of the UE 120. Because the higher frequency bands are associated with higher power consumption by the UE 120, the lower power efficiency of the UE 120 may result in the UE 120 consuming additional power to communicate an amount data, thereby resulting in a degraded battery life of the UE 120.

Various aspects relate generally to UE bandwidth reporting. Some aspects more specifically relate to a UE transmitting, to a network node, an indication of a bandwidth to be used by the UE, to optimize power efficiency of the UE or a spectral efficiency. In some aspects, the UE may transmit an indication of a first bandwidth requested to be used for communications associated with the UE, the first bandwidth being based at least in part on a parameter (for example, an estimated power efficiency of the UE or a spectral efficiency, among other examples) associated with the UE, and the parameter being based at least in part on one or more channel conditions. A network node may receive an indication of the first bandwidth and may configure the UE to use the requested bandwidth or another bandwidth (for example, the network node may accept or reject the request of the UE to use the first bandwidth). In other words, the network node may consider the first bandwidth requested by the UE when configuring a bandwidth that is to be used by the UE.

For example, a UE report of a desired bandwidth or BWP, may be defined. The UE may dynamically update a report of the bandwidth that is requested to be used for communications associated with the UE. For example, as channel conditions change or an estimated power efficiency of the UE changes, the UE may transmit an updated bandwidth that is requested to be used for communications associated with the UE.

Particular aspects of the subject matter described in this disclosure can be implemented to realize one or more of the following potential advantages. In some examples, the described techniques can be used to improve a power efficiency of the UE. For example, by reporting the requested bandwidth (for example, that is associated with a highest power efficiency of the UE), the UE may be configured with a bandwidth that results in improved power efficiency of the UE. Additionally, the described techniques can be used to improve spectral efficiency of communications between the UE and a network node because the UE may be configured with a larger bandwidth size (for example, resulting in improved throughput and increased spectral efficiency) while also ensuring that a power efficiency of the UE is optimized.

FIG. 4 is a diagram of an example associated with UE bandwidth reporting 400 in accordance with the present disclosure. As shown in FIG. 4, a network node 110 may communicate with a UE 120. In some aspects, one or more network nodes 110 may facilitate wireless communication for the UE 120. In some aspects, the network node 110 and the UE 120 may be part of a wireless network, such as the wireless network 100. In some aspects, the UE 120 and the network node 110 may have established a wireless connection prior to operations shown in FIG. 4.

As used herein, the network node 110 "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU transmitting a communication to an RU and the RU transmitting the communication to the UE 120. Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU.

In some aspects, in a first operation 405, the network node 110 may transmit, and the UE 120 may receive, configuration information. In some aspects, the network node 110 may receive the configuration information from another network node, such as a DU or a CU. In some aspects, the UE 120 may receive the configuration information via one or more of system information signaling (for example, via one or more system information blocks (SIBs)), RRC signaling, one or more medium access control (MAC) control elements (MAC-CEs), or downlink control information (DCI), among other examples. In some aspects, the configuration information may include an indication of one or more configuration parameters (for example, already stored by the UE 120 or previously indicated by the network node 110 or other network device) for selection by the UE 120, or explicit configuration information for the UE 120 to use to configure itself, among other examples.

In some aspects, the configuration information may indicate that the UE 120 is to transmit, to the network node 110, an indication of one or more bandwidths or BWPs that are requested to be used for communications between the UE 120 and the network node 110. For example, the configuration information may indicate that the UE 120 is to transmit a report of requested (or desired) bandwidths associated with the UE 120. As used herein, a "requested" or "desired" bandwidth may be a bandwidth requested (for example, by the UE 120) to be used for communications between the UE 120 and the network node 110 (for example, where the bandwidth is determined by the UE 120 based at least in part on one or more parameters, such as an estimated power efficiency or a spectral efficiency, among other examples).

In some aspects, the configuration information may indicate that the UE 120 is to report one or more requested bandwidths in a channel state feedback (CSF) report or in another report. In some aspects, the configuration information (for example, a SIB) may indicate that the UE 120 is to report one or more requested bandwidths part of a connection establishment procedure (for example, a random access channel (RACH) procedure or an RRC connection establishment procedure, among other examples) with the network node 110.

The UE 120 may configure itself based at least in part on the configuration information. In some aspects, the UE 120 may be configured to perform one or more operations described herein based at least in part on the configuration information.

In a second operation 410, the UE 120 may transmit, and the network node 110 may receive, a capability report. In some aspects, the capabilities report may indicate UE support for reporting requested bandwidths or BWPs to be used by the UE 120. In some aspects, the capability report may indicate that the UE 120 supports estimating a power efficiency that is based at least in part on the one or more channel conditions. For example, the capability report may indicate that the UE 120 supports identifying or determining a requested bandwidth based at least in part on an estimated power efficiency of the UE 120 using the requested bandwidth.

In some aspects, the configuration information may be based at least in part on the capability report (for example, the second operation 410 may occur before the first operation 405 in time). For example, the configuration information may indicate that the UE 120 is to report one or more requested bandwidths based at least in part on the capability report indicating UE support for reporting requested bandwidths or BWPs to be used by the UE 120.

In a third operation 415, the UE 120 may estimate, determine, or measure one or more parameters associated with the UE 120. For example, the UE 120 may estimate, determine, or measure one or more parameters based at least in part on one or more channel conditions, such as SINR, IPN, signal-to-noise ratio (SNR), RSRP, or RSRQ, among other examples. For example, the UE 120 may measure one or more signals to determine the one or more channel conditions. The UE 120 may estimate, determine, or measure one or more parameters based at least in part on the one or more determined channel conditions.

In some aspects, the one or more parameters include an estimated power efficiency of the UE 120. For example, the UE 120 may estimate a power efficiency of the UE 120 associated with various bandwidths or BWPs. For example, based at least in part on current channel conditions, the UE 120 may estimate an achievable throughput (for example, an amount of data that can be communicated) associated with a given bandwidth or BWP. The UE 120 may estimate an amount of power of the UE 120 that will be consumed to communicate the amount of data associated with a given bandwidth or BWP (for example, based at least in part on current channel conditions). The UE 120 may estimate the power efficiency associated with the given bandwidth or BWP based at least in part on the achievable throughput and the amount of power of the UE 120 that will be consumed by the UE 120. The UE 120 may estimate a power efficiency with multiple bandwidths or BWPs in a similar manner.

Additionally or alternatively, the one or more parameters include a spectral efficiency. For example, as part of the third operation 415, the UE 120 may estimate or determine a spectral efficiency associated with various bandwidths or BWPs. "Spectral efficiency" may refer to an information rate or a data rate that can be transmitted over a given bandwidth. The UE 120 may determine or estimate a spectral efficiency associated with one or more bandwidths or BWPs based at least in part on a size of the bandwidths or BWPs or current channel conditions.

In some aspects, the bandwidths or BWPs for which the UE 120 estimates, determines, or measures the one or more parameters may be based at least in part on the configuration information. For example, the UE 120 may estimate, determine, or measure the one or more parameters for bandwidths that are available to be used for communications with the network node 110. In some aspects, the UE 120 may estimate, determine, or measure the one or more parameters for one or more bandwidths over a frequency range that is available to be used for communications with the network node 110 (for example, as indicated by the configuration information).

In some aspects, the UE 120 may estimate, determine, or measure the one or more parameters for bandwidths having different sizes. For example, a bandwidth may be defined by a center frequency and a size (for example, a quantity of resource blocks or a size in units of hertz). The UE 120 may estimate, determine, or measure the one or more parameters for a first bandwidth associated with a first center frequency and a first size and for a second bandwidth associated with the first center frequency and a second size. The UE 120 may estimate, determine, or measure the one or more parameters downlink bandwidths (for example, bandwidths to be used for downlink communications). Additionally or alternatively, the 120 may estimate, determine, or measure the one or more parameters uplink bandwidths (for example, bandwidths to be used for uplink communications).

The UE 120 may determine one or more requested bandwidths based at least in part on the one or more parameters. For example, the UE 120 may determine a first bandwidth requested to be used for communications between the UE 120 and the network node 110 based at least in part on an estimated power efficiency associated with the first bandwidth or a spectral efficiency associated with the first bandwidth. For example, the UE 120 may determine one or more bandwidths to be requested for use for communications between the UE 120 and the network node 110 based at least in part on the one or more bandwidths being associated with a highest power efficiency or spectral efficiency for the UE 120. In other words, the UE 120 may select one or more bandwidths to be requested for use for communications between the UE 120 and the network node 110 to optimize a power efficiency or a spectral efficiency of the UE 120.

In some aspects, the UE 120 may receive, and the network node 110 may transmit, an indication that the UE is to report one or more requested bandwidths. For example, the network node 110 may transmit a communication that triggers the UE 120 to transmit a report of one or more requested bandwidths. In some aspects, the UE 120 may receive, and the network node 110 may transmit, an indication to transmit a requested bandwidth. In some aspects, the communication that triggers the UE 120 to transmit a report of one or more requested bandwidths may be based at least in part on the capability report transmitted by the UE 120 (for example, in the second operation 410). For example, the network node 110 may trigger the UE 120 to report the one or more requested bandwidths in accordance with a capability of the UE 120. For example, the network node 110 may trigger the UE 120 to report one or more desired bandwidth sizes and center frequencies in accordance with the UE capability report.

In a fourth operation 420, the UE 120 may transmit, and the network node 110 may receive, an indication of a first bandwidth requested to be used for communications between the UE 120 and the network node 110. As described elsewhere herein, the first bandwidth may be based at least in part on a parameter associated with the UE 120, such as an estimated power efficiency or a spectral efficiency. The parameter may be based at least in part on one or more channel conditions, such as SINR, IPN, SNR, RSRP, or RSRQ, among other examples.

In some aspects, the first bandwidth may be a downlink bandwidth. Additionally or alternatively, the first bandwidth may be an uplink bandwidth. In some aspects, the indication of the first bandwidth includes an indication of a center frequency and a bandwidth size associated with the first bandwidth. In some aspects, the indication of the first bandwidth may include an indication of multiple bandwidth sizes associated with the first bandwidth (for example, and the same center frequency). For example, the UE 120 may report the support of multiple bandwidth sizes, such as 1 GHz, 2 GHz, or 4 GHz, among other examples.

In some aspects, in the fourth operation 420, the UE 120 may transmit an indication of multiple bandwidths that are acceptable for use by the UE 120 (for example, based at least in part on one or more parameters, such as an estimated power efficiency or spectral efficiency). For example, the UE 120 may transmit an indication of bandwidths that are associated with an estimated power efficiency or spectral efficiency that satisfy a threshold.

In some aspects, the fourth operation 420 may occur during a connection establishment procedure with the network node 110, such as a RACH procedure or an RRC connection establishment procedure. For example, the indication of the first bandwidth may be included in a connection establishment communication. In some aspects, the indication of the first bandwidth may be included in an RRC communication. In some other aspects, the indication of the first bandwidth may be included in another type of communication, such as an uplink control channel communication, an uplink data channel or shared channel communication, or an uplink control information communication, among other examples. In some aspects, the indication of the first bandwidth may be included in CSF report (for example, a CSF report associated with a frequency band or subband in which the first bandwidth is included).

In some aspects, the UE 120 may transmit the indication of the first bandwidth in the fourth operation 420 based at least in part on receiving, from the network node 110, an indication to transmit the requested bandwidth (for example, the UE 120 may be triggered to transmit the report of the desired bandwidth by the network node 110). In some aspects, the first bandwidth may be associated with multiple (or all) layers that are associated with the UE 120. For example, the report of the first bandwidth may be common for all layers. As used herein, "layer" may refer to, or be associated with, a MIMO layer, a stream, or a port, among other examples.

In some other aspects, the first bandwidth may be associated with a single layer. For example, as part of the fourth operation 420, the UE 120 may transmit an indication of a respective requested bandwidth for each layer associated with the UE 120. In other words, the report from the UE 120 of a requested or desired bandwidth may be per layer.

In some aspects, the network node 110 may receive the indication of the first bandwidth and may determine whether the first bandwidth should be configured for the UE 120. For example, the network node 110 (or another network node, such as a CU or a DU) may determine whether the request from the UE 120 to use the first bandwidth should be accepted or rejected. For example, the network node 110 (or another network node) may determine whether to configure the first bandwidth for the UE 120 based at least in part on network usage, or bandwidths configured for other UEs in the wireless network, among other examples. In other words, the network node 110 (or another network node) may consider the requested or desired bandwidth of the UE 120 when determining or configuring a bandwidth for the UE 120.

In a fifth operation 425, the network node 110 may transmit, and the UE 120 may receive, an indication of a bandwidth to be used by the UE 120 (for example, for communications with the network node 110). For example, the network node 110 may transmit, and the UE 120 may receive, an indication that the first bandwidth (for example, if the request from the UE 120 is accepted) or a second bandwidth (for example, if the request from the UE 120 is rejected) is to be used for the communications between the UE 120 and the network node 110. In some aspects, the indication that the first bandwidth or the second bandwidth is to be used may be included in an RRC communication. In some aspects, the indication that the first bandwidth or the second bandwidth is to be used may be included in a MAC-CE communication.

In some aspects, in the fifth operation 425, the network node 110 may indicate whether the bandwidth that is configured for the UE 120 (for example, the first bandwidth or the second bandwidth) is to be used for multiple layers, all layers, or a single layer associated with the UE 120. For example, in the fifth operation 425, the network node 110 may indicate that the first bandwidth or the second bandwidth is to be used for multiple layers (or all layers) associated with the UE 120. Alternatively, in the fifth operation 425, the network node 110 may indicate that the first bandwidth or the second bandwidth is to be used for a single respective layer associated with the UE 120 or a subset of layers associated with the UE 120. In other words, the network node 110 may indicate to the UE 120 if the working bandwidth (for example, the first bandwidth or the second bandwidth) is the same for all layers or is different for each layer.

In some aspects, the indication that the first bandwidth or the second bandwidth is to be used may include an indication that the first bandwidth or the second bandwidth is to be used for downlink communications and uplink communications. For example, the network node 110 may indicate to the UE 120 whether the UE 120 is to use the same bandwidth (for example, the first bandwidth or the second bandwidth) for uplink transmissions as well as downlink receptions. In some aspects, the network node 110 may dynamically update the bandwidth to be used by the UE 120. For example, the network node 110 may dynamically update the bandwidth based at least in part on the report of the requested bandwidth that is transmitted by the UE 120.

In a sixth operation 430, the network node 110 and the UE 120 may communicate using the bandwidth (for example, the first bandwidth or the second bandwidth) indicated by the network node in the fifth operation 425. For example, the UE 120 may communicate (for example, transmit or receive), with the network node 110, one or more signals using the first bandwidth or the second bandwidth. In some aspects, the UE 120 may receive a downlink data communication (for example, a physical downlink shared channel (PDSCH) communication) and a downlink control channel communication (for example, a physical downlink control channel (PDCCH) communication) using the first bandwidth or the second bandwidth. For example, a PDSCH and a PDCCH will be transmitted on the updated bandwidth size (for example, as indicated by the network node in the fifth operation 425) to reduce power consumption of the UE 120.

In some aspects, because the network node 110 may dynamically update the bandwidth to be used by the UE 120, the bandwidth used by the UE 120 may at least partially overlap (for example, in the frequency domain) with a bandwidth used by another UE in the wireless network. In such examples, the network node 110 (or another network node) may update a location of a DCI hypothesis (for example, a time-frequency resources that is to be monitored by the UE 120 to receive DCI or PDCCH communications) for the UE 120 to reduce a likelihood of a collision with a DCI hypothesis associated with the other UE. In other words, the network node 110 (or another network node) may configure DCI hypothesis for the UE 120 so as to not overlap with a DCI hypothesis for another UE in the wireless network (for example, because an overlapping or colliding DCI hypothesis may cause interference at the UE 120).

In some aspects, in seventh operation 435, the UE 120 may determine to update one or more requested bandwidths. For example, the UE 120 may detect or identify an event that triggers the UE 120 to update the one or more requested bandwidths. For example, the UE 120 may detect that a change in a value of at least one channel condition, from the one or more channel conditions (for example, that were used to estimate or determine the power efficiency or spectral efficiency associated with a requested bandwidth), satisfies a threshold. As another example, the UE 120 may detect a change (for example, from a time associated with the third operation 415) in an estimated power efficiency of the UE 120, associated with the first bandwidth or the second bandwidth (for example, the bandwidth used by the UE 120 as indicated in the fifth operation 425), satisfies a threshold. In other words, the UE 120 may dynamically update the report of the requested or desired bandwidth based at least in part on a change (for example, from a time associated with the third operation 415) in the channel conditions, SINR, or IPN, among other examples. Additionally or alternatively, the UE 120 may dynamically update the report of the requested or desired bandwidth based at least in part on detecting that the chosen bandwidth size or center frequency (for example, the bandwidth indicated in the fifth operation 425) is not optimal.

In an eighth operation 440, the UE 120 may transmit, and the network node 110 may receive, an indication of one or more updated requested bandwidths. For example, the UE 120 may transmit a third bandwidth requested to be used for the communications between the UE 120 and the network node 110. The third bandwidth may be based at least in part on an estimated power efficiency of the UE 120 associated with the change in the value of the at least one channel condition. As another example, the UE 120 may transmit the indication of the third bandwidth based at least in part on a change in a power efficiency of the UE 120, associated with the first bandwidth or the second bandwidth, satisfying a threshold.

Figure 5:
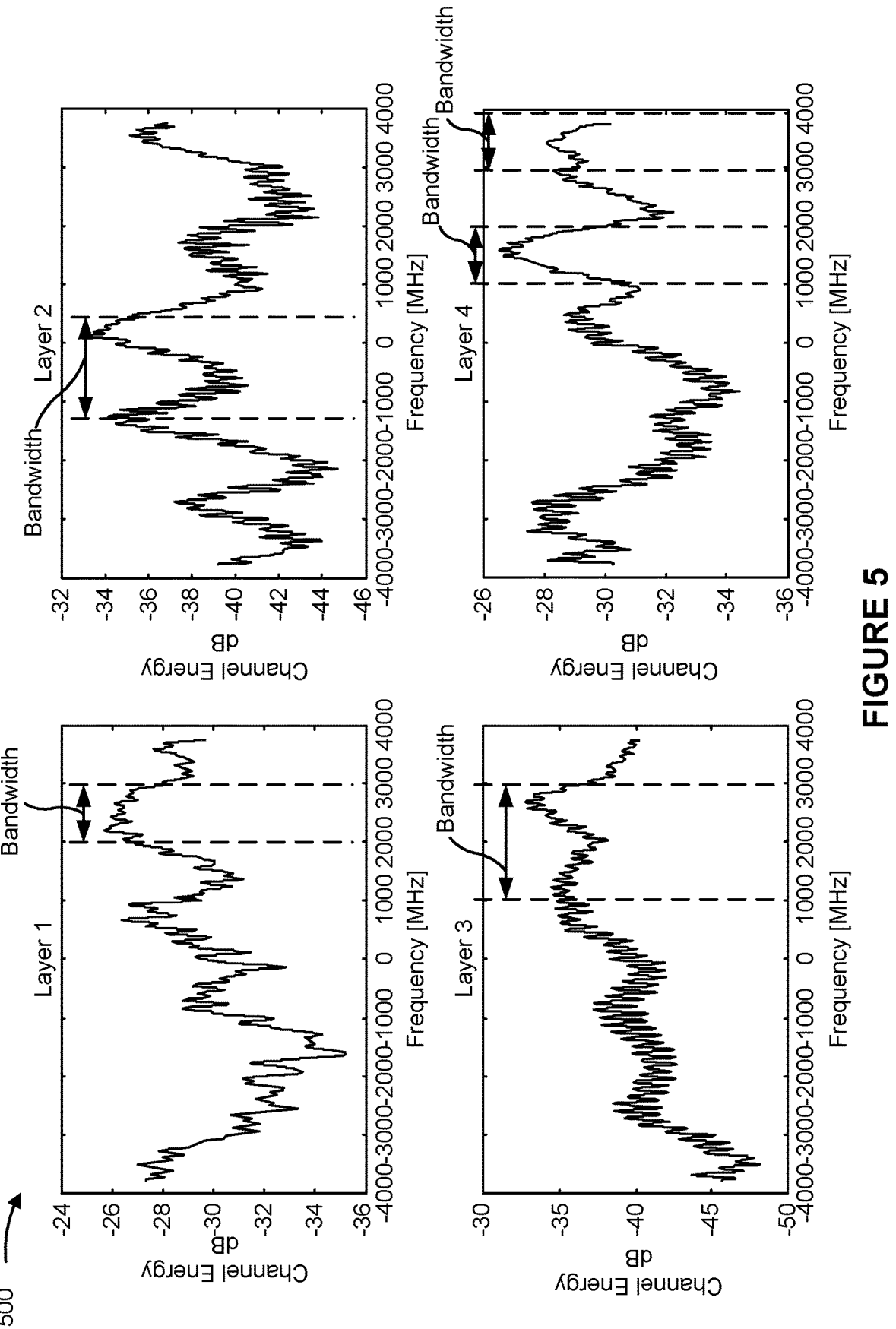
FIG. 5 is a diagram of an example associated with requested bandwidths associated with different layers in accordance with the present disclosure.

FIG. 5 is a diagram of an example associated with requested bandwidths 500 associated with different layers in accordance with the present disclosure. As shown in FIG. 5, an energy of a channel may be different for different layers of the UE 120 over the same frequency range. Therefore, different bandwidths may be associated with a highest power efficiency of the UE 120 for different layers of the UE 120.

For example, as shown in FIG. 5, for a first layer of the UE 120, the UE 120 may identify that a requested bandwidth should be approximately 2000 MHz to 3000 MHz greater than a reference frequency (shown as "0" on the X-axis in the graph depicted in FIG. 5). For example, the requested bandwidth may be a 1 GHz bandwidth with a center frequency at 2500 MHz greater than the reference frequency. For example, in this frequency range for the first layer, the channel may be associated with a higher energy. Therefore, the power efficiency of the UE 120 may be improved when operating this frequency range (for example, as compared to a lower frequency where the energy of the channel is lower).

As another example, for a second layer of the UE 120, the UE 120 may identify that a requested bandwidth should be approximately 1500 MHz less than the reference frequency to 500 MHz greater than the reference frequency (for example, a 2 GHz bandwidth with a center frequency at 500 MHz less than the reference frequency). As another example, for a third layer of the UE 120, the UE 120 may identify that the requested bandwidth should be approximately 1000 MHz to 3000 MHz greater than a reference frequency (for example, a 2 GHz bandwidth with a center frequency at 2000 MHz greater than the reference frequency).

As another example, for a fourth layer of the UE 120, the UE 120 may identify that a first requested bandwidth should be approximately from the reference frequency to 2000 MHz greater than the reference frequency (for example, a 2 GHz bandwidth with a center frequency at 1000 MHz greater than the reference frequency). Additionally, the UE 120 may identify that a second requested bandwidth should be approximately from 3000 MHz to 4000 MHz greater than the reference frequency (for example, a 1 GHz bandwidth with a center frequency at 3500 MHz greater than the reference frequency).

In some aspects, different bandwidths sizes (for example, associated with the same center frequencies) may be associated with different power efficiencies of the UE 120 as SINR changes or as a distance between the UE 120 and a network node 110 changes. For example, at shorter distances between the UE 120 and the network node 110, the SINR may be high such that increase in the bandwidth size translates almost linearly to increase in the capacity versus the power consumed by the UE 120 (for example, which may not be linear because one or more components may share multiple bandwidths such as a low noise amplifier, or phase shifters, among other examples). However, at longer distances, the capacity may no longer linear be with the bandwidth size and the largest bandwidth size may no longer the most power efficient for the UE 120. For example, at longer distances between the UE 120 and the network node 110, a 3.75 GHz bandwidth or a 1.5 GHz bandwidth may be more power efficient than a 7.5 GHz bandwidth for the UE 120 (for example, even though the 7.5 GHz bandwidth may be associated with a higher achievable throughput) due to the power consumption of the UE 120.

FIG. 6 is a flowchart illustrating an example process 600 performed, for example, by a UE, associated with UE bandwidth reporting in accordance with the present disclosure. Example process 600 is an example where the UE (for example, UE 120) performs operations associated with UE bandwidth reporting.

As shown in FIG. 6, in some aspects, process 600 may include transmitting, to a network node, an indication of a first bandwidth requested to be used for communications between the UE and the network node, the first bandwidth being based at least in part on a parameter associated with the UE, and the parameter being based at least in part on one or more channel conditions (block 610). For example, the UE (such as by using communication manager 140 or transmission component 804, depicted in FIG. 8) may transmit, to a network node, an indication of a first bandwidth requested to be used for communications between the UE and the network node, the first bandwidth being based at least in part on a parameter associated with the UE, and the parameter being based at least in part on one or more channel conditions, as described above.

As further shown in FIG. 6, in some aspects, process 600 may include receiving, from the network node, an indication that the first bandwidth or a second bandwidth is to be used for the communications between the UE and the network node (block 620). For example, the UE (such as by using communication manager 140 or reception component 802, depicted in FIG. 8) may receive, from the network node, an indication that the first bandwidth or a second bandwidth is to be used for the communications between the UE and the network node, as described above.

Process 600 may include additional aspects, such as any single aspect or any combination of aspects described below or in connection with one or more other processes described elsewhere herein.

In a first additional aspect, the parameter includes at least one of an estimated power efficiency or a spectral efficiency.

In a second additional aspect, alone or in combination with the first aspect, process 600 includes transmitting, to the network node, a capability report indicating that the UE supports estimating a power efficiency that is based at least in part on the one or more channel conditions.

In a third additional aspect, alone or in combination with one or more of the first and second aspects, process 600 includes communicating, with the network node, one or more signals using the first bandwidth or the second bandwidth.

In a fourth additional aspect, alone or in combination with one or more of the first through third aspects, the first bandwidth is a downlink bandwidth or an uplink bandwidth.

In a fifth additional aspect, alone or in combination with one or more of the first through fourth aspects, the indication of the first bandwidth includes an indication of a center frequency and a bandwidth size associated with the first bandwidth.

In a sixth additional aspect, alone or in combination with one or more of the first through fifth aspects, the indication of the first bandwidth includes an indication of multiple bandwidth sizes associated with the first bandwidth.

In a seventh additional aspect, alone or in combination with one or more of the first through sixth aspects, the indication of the first bandwidth is included in a connection establishment communication.

In an eighth additional aspect, alone or in combination with one or more of the first through seventh aspects, process 600 includes receiving, from the network node, an indication to transmit a requested bandwidth, and transmitting the indication of the first bandwidth is based at least in part on receiving the indication to transmit the requested bandwidth.

In a ninth additional aspect, alone or in combination with one or more of the first through eighth aspects, the first bandwidth is associated with all layers that are associated with the UE.

In a tenth additional aspect, alone or in combination with one or more of the first through ninth aspects, transmitting the indication of the first bandwidth includes transmitting an indication of a respective requested bandwidth for each layer associated with the UE.

In an eleventh additional aspect, alone or in combination with one or more of the first through tenth aspects, process 600 includes detecting that a change in a value of at least one channel condition, from the one or more channel conditions, satisfies a threshold, and transmitting, to the network node, a third bandwidth requested to be used for the communications between the UE and the network node, where the third bandwidth is based at least in part on an estimated power efficiency of the UE associated with the change in the value of the at least one channel condition.

In a twelfth additional aspect, alone or in combination with one or more of the first through eleventh aspects, process 600 includes transmitting, to the network node, an indication of a third bandwidth requested to be used for the communications between the UE and the network node based at least in part on a change in a power efficiency of the UE, associated with the first bandwidth or the second bandwidth, satisfying a threshold.

In a thirteenth additional aspect, alone or in combination with one or more of the first through twelfth aspects, the indication that the first bandwidth or the second bandwidth is to be used is included in an RRC communication.

In a fourteenth additional aspect, alone or in combination with one or more of the first through thirteenth aspects, the indication that the first bandwidth or the second bandwidth is to be used is included in a MAC-CE communication.

In a fifteenth additional aspect, alone or in combination with one or more of the first through fourteenth aspects, the indication that the first bandwidth or the second bandwidth is to be used includes an indication that the first bandwidth or the second bandwidth is to be used for multiple layers associated with the UE.

In a sixteenth additional aspect, alone or in combination with one or more of the first through fifteenth aspects, the indication that the first bandwidth or the second bandwidth is to be used includes an indication that the first bandwidth or the second bandwidth is to be used for a single respective layer associated with the UE or a subset of layers associated with the UE.

In a seventeenth additional aspect, alone or in combination with one or more of the first through sixteenth aspects, the indication that the first bandwidth or the second bandwidth is to be used includes an indication that the first bandwidth or the second bandwidth is to be used for downlink communications and uplink communications.

In an eighteenth additional aspect, alone or in combination with one or more of the first through seventeenth aspects, process 600 includes receiving, from the network node, a downlink data communication and a downlink control channel communication using the first bandwidth or the second bandwidth.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

FIG. 7 is a flowchart illustrating an example process 700 performed, for example, by a network node in accordance with the present disclosure. Example process 700 is an example where the network node (for example, the network node 110) performs operations associated with UE bandwidth reporting.

As shown in FIG. 7, in some aspects, process 700 may include receiving an indication of a first bandwidth requested to be used for communications associated with a UE, the first bandwidth being based at least in part on a parameter associated with the UE, and the parameter being based at least in part on one or more channel conditions (block 710). For example, the network node (such as by using communication manager 150 or reception component 902, depicted in FIG. 9) may receive an indication of a first bandwidth requested to be used for communications associated with a UE, the first bandwidth being based at least in part on a parameter associated with the UE, and the parameter being based at least in part on one or more channel conditions, as described above.

As further shown in FIG. 7, in some aspects, process 700 may include transmitting an indication that the first bandwidth or a second bandwidth is to be used for the communications associated with the UE (block 720). For example, the network node (such as by using communication manager 150 or transmission component 904, depicted in FIG. 9) may transmit an indication that the first bandwidth or a second bandwidth is to be used for the communications associated with the UE, as described above.

Process 700 may include additional aspects, such as any single aspect or any combination of aspects described below or in connection with one or more other processes described elsewhere herein.

In a first additional aspect, the parameter includes at least one of an estimated power efficiency or a spectral efficiency.

In a second additional aspect, alone or in combination with the first aspect, process 700 includes receiving a capability report indicating that the UE supports estimating a power efficiency that is based at least in part on the one or more channel conditions.

In a third additional aspect, alone or in combination with one or more of the first and second aspects, process 700 includes communicating, with the UE, one or more signals using the first bandwidth or the second bandwidth.

In a fourth additional aspect, alone or in combination with one or more of the first through third aspects, the first bandwidth is a downlink bandwidth or an uplink bandwidth.

In a fifth additional aspect, alone or in combination with one or more of the first through fourth aspects, the indication of the first bandwidth includes an indication of a center frequency and a bandwidth size associated with the first bandwidth.

In a sixth additional aspect, alone or in combination with one or more of the first through fifth aspects, the indication of the first bandwidth includes an indication of multiple bandwidth sizes associated with the first bandwidth.

In a seventh additional aspect, alone or in combination with one or more of the first through sixth aspects, the indication of the first bandwidth is included in a connection establishment communication.

In an eighth additional aspect, alone or in combination with one or more of the first through seventh aspects, process 700 includes transmitting an indication that the UE is to transmit a requested bandwidth.

In a ninth additional aspect, alone or in combination with one or more of the first through eighth aspects, the first bandwidth is associated with all layers that are associated with the UE.

In a tenth additional aspect, alone or in combination with one or more of the first through ninth aspects, receiving the indication of the first bandwidth includes receiving an indication of a respective requested bandwidth for each layer associated with the UE.

In an eleventh additional aspect, alone or in combination with one or more of the first through tenth aspects, process 700 includes receiving a third bandwidth requested to be used for the communications associated with the UE, where the third bandwidth is based at least in part on a change of an estimated power efficiency of the UE satisfying a threshold.

In a twelfth additional aspect, alone or in combination with one or more of the first through eleventh aspects, the indication that the first bandwidth or the second bandwidth is to be used is included in an RRC communication.

In a thirteenth additional aspect, alone or in combination with one or more of the first through twelfth aspects, the indication that the first bandwidth or the second bandwidth is to be used is included in a MAC-CE communication.

In a fourteenth additional aspect, alone or in combination with one or more of the first through thirteenth aspects, the indication that the first bandwidth or the second bandwidth is to be used includes an indication that the first bandwidth or the second bandwidth is to be used for multiple layers associated with the UE.

In a fifteenth additional aspect, alone or in combination with one or more of the first through fourteenth aspects, the indication that the first bandwidth or the second bandwidth is to be used includes an indication that the first bandwidth or the second bandwidth is to be used for a single respective layer associated with the UE or a subset of layers associated with the UE.

In a sixteenth additional aspect, alone or in combination with one or more of the first through fifteenth aspects, process 700 includes transmitting a downlink data communication and a downlink control channel communication using the first bandwidth or the second bandwidth.

In a seventeenth additional aspect, alone or in combination with one or more of the first through sixteenth aspects, the indication that the first bandwidth or the second bandwidth is to be used includes an indication that the first bandwidth or the second bandwidth is to be used for downlink communications and uplink communications.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
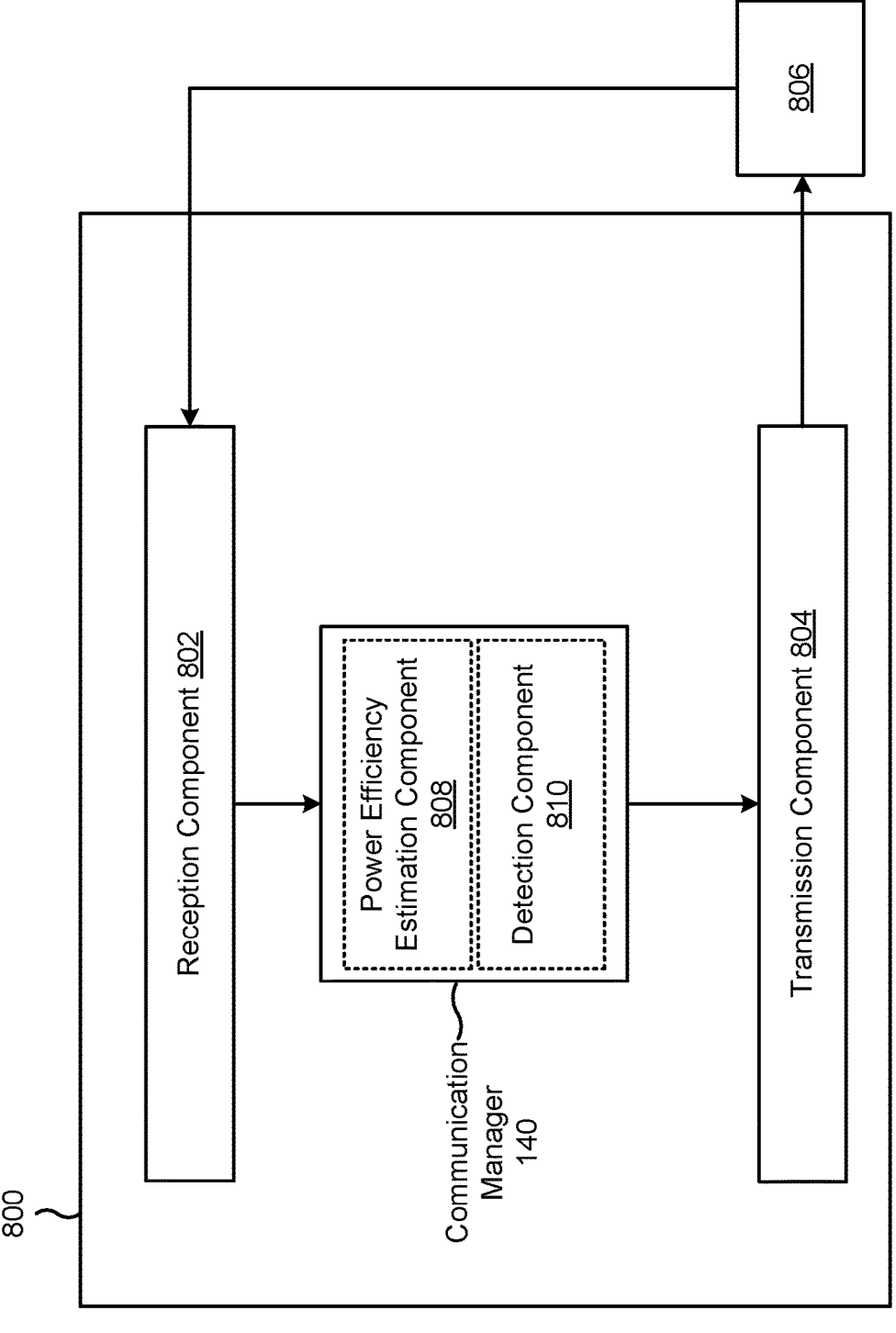
FIG. 8 is a diagram of an example apparatus for wireless communication in accordance with the present disclosure.

FIG. 8 is a diagram of an example apparatus 800 for wireless communication in accordance with the present disclosure. The apparatus 800 may be a UE, or a UE may include the apparatus 800. In some aspects, the apparatus 800 includes a reception component 802, a transmission component 804, and a communication manager 140, which may be in communication with one another (for example, via one or more buses). As shown, the apparatus 800 may communicate with another apparatus 806 (such as a UE, a base station, a network node, or another wireless communication device) using the reception component 802 and the transmission component 804.

In some aspects, the apparatus 800 may be configured to perform one or more operations described herein in connection with FIGS. 4-5. Additionally or alternatively, the apparatus 800 may be configured to perform one or more processes described herein, such as process 600 of FIG. 6, or a combination thereof. In some aspects, the apparatus 800 may include one or more components of the UE described above in connection with FIG. 2.

The reception component 802 may receive communications, such as reference signals, control information, data communications, or a combination thereof, from the apparatus 806. The reception component 802 may provide received communications to one or more other components of the apparatus 800, such as the communication manager 140. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, the communication manager 140 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The communication manager 140 may transmit or may cause the transmission component 804 to transmit, to a network node, an indication of a first bandwidth requested to be used for communications between the UE and the network node, the first bandwidth being based at least in part on a parameter associated with the UE, and the parameter being based at least in part on one or more channel conditions. The communication manager 140 may receive or may cause the reception component 802 to receive, from the network node, an indication that the first bandwidth or a second bandwidth is to be used for the communications between the UE and the network node. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a power efficiency estimation component 808, a detection component 810, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 804 may transmit, to a network node, an indication of a first bandwidth requested to be used for communications between the UE and the network node, the first bandwidth being based at least in part on a parameter associated with the UE, and the parameter being based at least in part on one or more channel conditions. The reception component 802 may receive, from the network node, an indication that the first bandwidth or a second bandwidth is to be used for the communications between the UE and the network node.

The power efficiency estimation component 808 may estimate a power efficiency of the UE associated with the first bandwidth, wherein the power efficiency is estimated based at least in part on the one or more channel conditions.

The transmission component 804 may transmit, to the network node, a capability report indicating that the UE supports estimating a power efficiency that is based at least in part on the one or more channel conditions.

The reception component 802 or the transmission component 804 may communicate, with the network node, one or more signals using the first bandwidth or the second bandwidth.

The reception component 802 may receive, from the network node, an indication to transmit a requested bandwidth, and wherein transmitting the indication of the first bandwidth is based at least in part on receiving the indication to transmit the requested bandwidth.

The detection component 810 may detect that a change in a value of at least one channel condition, from the one or more channel conditions, satisfies a threshold.

The transmission component 804 may transmit, to the network node, a third bandwidth requested to be used for the communications between the UE and the network node, wherein the third bandwidth is based at least in part on an estimated power efficiency of the UE associated with the change in the value of the at least one channel condition.

The transmission component 804 may transmit, to the network node, an indication of a third bandwidth requested to be used for the communications between the UE and the network node based at least in part on a change in a power efficiency of the UE, associated with the first bandwidth or the second bandwidth, satisfying a threshold.

The reception component 802 may receive, from the network node, a downlink data communication and a downlink control channel communication using the first bandwidth or the second bandwidth.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
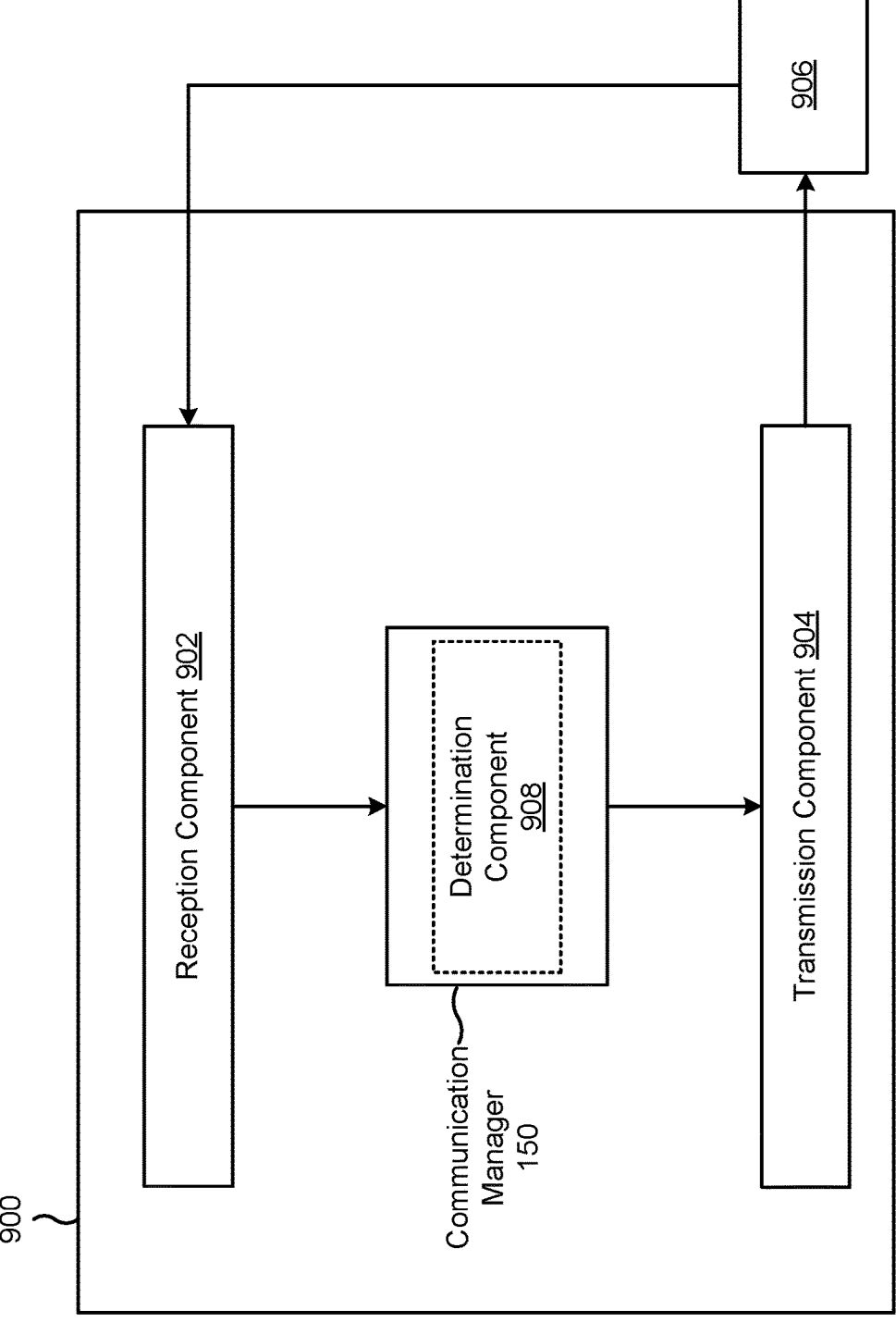
FIG. 9 is a diagram of an example apparatus for wireless communication in accordance with the present disclosure.

FIG. 9 is a diagram of an example apparatus 900 for wireless communication in accordance with the present disclosure. The apparatus 900 may be a network node, or a network node may include the apparatus 900. In some aspects, the apparatus 900 includes a reception component 902, a transmission component 904, and a communication manager 150, which may be in communication with one another (for example, via one or more buses). As shown, the apparatus 900 may communicate with another apparatus 906 (such as a UE, a base station, a network node, or another wireless communication device) using the reception component 902 and the transmission component 904.

In some aspects, the apparatus 900 may be configured to perform one or more operations described herein in connection with FIGS. 4-5. Additionally or alternatively, the apparatus 900 may be configured to perform one or more processes described herein, such as process 700 of FIG. 7, or a combination thereof. In some aspects, the apparatus 900 may include one or more components of the network node described above in connection with FIG. 2.

The reception component 902 may receive communications, such as reference signals, control information, data communications, or a combination thereof, from the apparatus 906. The reception component 902 may provide received communications to one or more other components of the apparatus 900, such as the communication manager 150. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, a memory, or a combination thereof, of the network node described above in connection with FIG. 2.

The transmission component 904 may transmit communications, such as reference signals, control information, data communications, or a combination thereof, to the apparatus 906. In some aspects, the communication manager 150 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described above in connection with FIG. 2. In some aspects, the transmission component 904 may be co-located with the reception component 902 in a transceiver.

The communication manager 150 may receive or may cause the reception component 902 to receive an indication of a first bandwidth requested to be used for communications associated with a UE, the first bandwidth being based at least in part on a parameter associated with the UE, and the parameter being based at least in part on one or more channel conditions. The communication manager 150 may transmit or may cause the transmission component 904 to transmit an indication that the first bandwidth or a second bandwidth is to be used for the communications associated with the UE. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network node described above in connection with FIG. 2. In some aspects, the communication manager 150 includes a set of components, such as a determination component 908, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive an indication of a first bandwidth requested to be used for communications associated with a UE, the first bandwidth being based at least in part on a parameter associated with the UE, and the parameter being based at least in part on one or more channel conditions. The transmission component 904 may transmit an indication that the first bandwidth or a second bandwidth is to be used for the communications associated with the UE.

The determination component 908 may determine the first bandwidth or the second bandwidth based at least in part on receiving the indication of the first bandwidth.

The reception component 902 may receive a capability report indicating that the UE supports estimating a power efficiency that is based at least in part on the one or more channel conditions.

The reception component 902 or the transmission component 904 may communicate, with the UE, one or more signals using the first bandwidth or the second bandwidth.

The transmission component 904 may transmit an indication that the UE is to transmit a requested bandwidth.

The reception component 902 may receive a third bandwidth requested to be used for the communications associated with the UE, wherein the third bandwidth is based at least in part on a change of an estimated power efficiency of the UE satisfying a threshold.

The transmission component 904 may transmit a downlink data communication and a downlink control channel communication using the first bandwidth or the second bandwidth.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting, to a network node, an indication of a first bandwidth requested to be used for communications between the UE and the network node, the first bandwidth being based at least in part on a parameter associated with the UE, and the parameter being based at least in part on one or more channel conditions; and receiving, from the network node, an indication that the first bandwidth or a second bandwidth is to be used for the communications between the UE and the network node.

Aspect 2: The method of Aspect 1, wherein the parameter includes at least one of an estimated power efficiency or a spectral efficiency.

Aspect 3: The method of any of Aspects 1-2, further comprising transmitting, to the network node, a capability report indicating that the UE supports estimating a power efficiency that is based at least in part on the one or more channel conditions.

Aspect 4: The method of any of Aspects 1-3, further comprising communicating, with the network node, one or more signals using the first bandwidth or the second bandwidth.

Aspect 5: The method of any of Aspects 1-4, wherein the first bandwidth is a downlink bandwidth or an uplink bandwidth.

Aspect 6: The method of any of Aspects 1-5, wherein the indication of the first bandwidth includes an indication of a center frequency and a bandwidth size associated with the first bandwidth.

Aspect 7: The method of any of Aspects 1-6, wherein the indication of the first bandwidth includes an indication of multiple bandwidth sizes associated with the first bandwidth.

Aspect 8: The method of any of Aspects 1-7, wherein the indication of the first bandwidth is included in a connection establishment communication.

Aspect 9: The method of any of Aspects 1-8, further comprising receiving, from the network node, an indication to transmit a requested bandwidth, and wherein transmitting the indication of the first bandwidth is based at least in part on receiving the indication to transmit the requested bandwidth.

Aspect 10: The method of any of Aspects 1-9, wherein the first bandwidth is associated with all layers that are associated with the UE.

Aspect 11: The method of any of Aspects 1-9, wherein transmitting the indication of the first bandwidth comprises transmitting an indication of a respective requested bandwidth for each layer associated with the UE.

Aspect 12: The method of any of Aspects 1-11, further comprising: detecting that a change in a value of at least one channel condition, from the one or more channel conditions, satisfies a threshold; and transmitting, to the network node, a third bandwidth requested to be used for the communications between the UE and the network node, wherein the third bandwidth is based at least in part on an estimated power efficiency of the UE associated with the change in the value of the at least one channel condition.

Aspect 13: The method of any of Aspects 1-12, further comprising: transmitting, to the network node, an indication of a third bandwidth requested to be used for the communications between the UE and the network node based at least in part on a change in a power efficiency of the UE, associated with the first bandwidth or the second bandwidth, satisfying a threshold.

Aspect 14: The method of any of Aspects 1-13, wherein the indication that the first bandwidth or the second bandwidth is to be used is included in a radio resource control (RRC) communication.

Aspect 15: The method of any of Aspects 1-14, wherein the indication that the first bandwidth or the second bandwidth is to be used is included in a medium access control (MAC) control element (MAC-CE) communication.

Aspect 16: The method of any of Aspects 1-15, wherein the indication that the first bandwidth or the second bandwidth is to be used includes an indication that the first bandwidth or the second bandwidth is to be used for multiple layers associated with the UE.

Aspect 17: The method of any of Aspects 1-15, wherein the indication that the first bandwidth or the second bandwidth is to be used includes an indication that the first bandwidth or the second bandwidth is to be used for a single respective layer associated with the UE or a subset of layers associated with the UE.

Aspect 18: The method of any of Aspects 1-17, wherein the indication that the first bandwidth or the second bandwidth is to be used includes an indication that the first bandwidth or the second bandwidth is to be used for downlink communications and uplink communications.

Aspect 19: The method of any of Aspects 1-18, further comprising receiving, from the network node, a downlink data communication and a downlink control channel communication using the first bandwidth or the second bandwidth.

Aspect 20: A method of wireless communication performed by a network node, comprising: receiving an indication of a first bandwidth requested to be used for communications associated with a user equipment (UE), the first bandwidth being based at least in part on a parameter associated with the UE, and the parameter being based at least in part on one or more channel conditions; and transmitting an indication that the first bandwidth or a second bandwidth is to be used for the communications associated with the UE.

Aspect 21: The method of Aspect 20, wherein the parameter includes at least one of an estimated power efficiency or a spectral efficiency.

Aspect 22: The method of any of Aspects 20-21, further comprising receiving a capability report indicating that the UE supports estimating a power efficiency that is based at least in part on the one or more channel conditions.

Aspect 23: The method of any of Aspects 20-22, further comprising communicating, with the UE, one or more signals using the first bandwidth or the second bandwidth.

Aspect 24: The method of any of Aspects 20-23, wherein the first bandwidth is a downlink bandwidth or an uplink bandwidth.

Aspect 25: The method of any of Aspects 20-24, wherein the indication of the first bandwidth includes an indication of a center frequency and a bandwidth size associated with the first bandwidth.

Aspect 26: The method of any of Aspects 20-25, wherein the indication of the first bandwidth includes an indication of multiple bandwidth sizes associated with the first bandwidth.

Aspect 27: The method of any of Aspects 20-26, wherein the indication of the first bandwidth is included in a connection establishment communication.

Aspect 28: The method of any of Aspects 20-27, further comprising transmitting an indication that the UE is to transmit a requested bandwidth.

Aspect 29: The method of any of Aspects 20-28, wherein the first bandwidth is associated with all layers that are associated with the UE.

Aspect 30: The method of any of Aspects 20-28, wherein receiving the indication of the first bandwidth comprises receiving an indication of a respective requested bandwidth for each layer associated with the UE.

Aspect 31: The method of any of Aspects 20-30, further comprising: receiving a third bandwidth requested to be used for the communications associated with the UE, wherein the third bandwidth is based at least in part on a change of an estimated power efficiency of the UE satisfying a threshold.

Aspect 32: The method of any of Aspects 20-31, wherein the indication that the first bandwidth or the second bandwidth is to be used is included in a radio resource control (RRC) communication.

Aspect 33: The method of any of Aspects 20-32, wherein the indication that the first bandwidth or the second bandwidth is to be used is included in a medium access control (MAC) control element (MAC-CE) communication.

Aspect 34: The method of any of Aspects 20-33, wherein the indication that the first bandwidth or the second bandwidth is to be used includes an indication that the first bandwidth or the second bandwidth is to be used for multiple layers associated with the UE.

Aspect 35: The method of any of Aspects 20-33, wherein the indication that the first bandwidth or the second bandwidth is to be used includes an indication that the first bandwidth or the second bandwidth is to be used for a single respective layer associated with the UE or a subset of layers associated with the UE.

Aspect 36: The method of any of Aspects 20-35, further comprising transmitting a downlink data communication and a downlink control channel communication using the first bandwidth or the second bandwidth.

Aspect 37: The method of any of Aspects 20-36, wherein the indication that the first bandwidth or the second bandwidth is to be used includes an indication that the first bandwidth or the second bandwidth is to be used for downlink communications and uplink communications.

Aspect 38: An apparatus for wireless communication at a device, comprising a processor; memory coupled with the processor; and instructions stored in the memory and executable by the processor to cause the apparatus to perform the method of one or more of Aspects 1-19.

Aspect 39: A device for wireless communication, comprising a memory and one or more processors coupled to the memory, the one or more processors configured to perform the method of one or more of Aspects 1-19.

Aspect 40: An apparatus for wireless communication, comprising at least one means for performing the method of one or more of Aspects 1-19.

Aspect 41: A non-transitory computer-readable medium storing code for wireless communication, the code comprising instructions executable by a processor to perform the method of one or more of Aspects 1-19.

Aspect 42: A non-transitory computer-readable medium storing a set of instructions for wireless communication, the set of instructions comprising one or more instructions that, when executed by one or more processors of a device, cause the device to perform the method of one or more of Aspects 1-19.

Aspect 43: An apparatus for wireless communication at a device, comprising a processor; memory coupled with the processor; and instructions stored in the memory and executable by the processor to cause the apparatus to perform the method of one or more of Aspects 20-37.

Aspect 44: A device for wireless communication, comprising a memory and one or more processors coupled to the memory, the one or more processors configured to perform the method of one or more of Aspects 20-37.

Aspect 45: An apparatus for wireless communication, comprising at least one means for performing the method of one or more of Aspects 20-37.

Aspect 46: A non-transitory computer-readable medium storing code for wireless communication, the code comprising instructions executable by a processor to perform the method of one or more of Aspects 20-37.

Aspect 47: A non-transitory computer-readable medium storing a set of instructions for wireless communication, the set of instructions comprising one or more instructions that, when executed by one or more processors of a device, cause the device to perform the method of one or more of Aspects 20-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

at least one memory; and at least one processor coupled with the at least one memory, the at least one processor configured to cause the UE to:

transmit, to a network node, a capability report indicating that the UE supports reporting of a requested bandwidth in accordance with an efficiency associated with the UE;

receive, from the network node and in accordance with the capability report, an indication to transmit the requested bandwidth;

transmit, to the network node, an indication of a first bandwidth requested to be used for communications between the UE and the network node, the first bandwidth being in accordance with the efficiency associated with the UE and a change to one or more channel conditions; and receive, from the network node, an indication that the first bandwidth or a second bandwidth is to be used for the communications between the UE and the network node.

2. The UE of claim 1, wherein the efficiency associated with the UE includes at least one of an estimated power efficiency of the UE or a spectral efficiency.

3. The UE of claim 1, wherein capability report further indicates that the UE supports estimating a power efficiency that is based at least in part on the change to one or more channel conditions, wherein the efficiency associated with the UE comprises the power efficiency.

4. The UE of claim 1, wherein the at least one processor is further configured to cause the UE to communicate, with the network node, one or more signals using the first bandwidth or the second bandwidth.

5. The UE of claim 1,
wherein the indication of the first bandwidth includes an indication of a center frequency and a bandwidth size of the first bandwidth.

6. The UE of claim 1,
wherein the indication of the first bandwidth is included in a connection establishment communication.

7. The UE of claim 1,
wherein transmitting the indication of the first bandwidth is in accordance with receiving the indication to transmit the requested bandwidth.

8. The UE of claim 1, wherein, to cause the UE to transmit the indication of the first bandwidth, the at least one processor is configured to cause the UE to transmit an indication of a respective requested bandwidth for each layer of the UE.

9. The UE of claim 1,
wherein the at least one processor is further configured to cause the UE to:
   detect that the change in the one or more channel conditions comprises a change in a value of at least one channel condition, of the one or more channel conditions, wherein the change satisfies a threshold; and
   transmit, to the network node, a third bandwidth requested to be used for the communications between the UE and the network node, wherein the third bandwidth is in accordance with an estimated power efficiency of the UE corresponding to the change in the value of the at least one channel condition, wherein the efficiency associated with the UE comprises the estimated power efficiency of the UE.

10. The UE of claim 1,
wherein the at least one processor is further configured to cause the UE to:
   transmit, to the network node, an indication of a third bandwidth requested to be used for the communications between the UE and the network node in accordance with a change in a power efficiency of the UE, corresponding to the first bandwidth or the second bandwidth, satisfying a threshold, wherein the efficiency of the UE comprises the power efficiency of the UE.

11. The UE of claim 1,
wherein the indication that the first bandwidth or the second bandwidth is to be used is included in a radio resource control (RRC) communication or a medium access control (MAC) control element (MAC-CE) communication.

12. The UE of claim 1,
wherein the indication that the first bandwidth or the second bandwidth is to be used includes an indication that the first bandwidth or the second bandwidth is to be used for multiple layers of the UE or for a single respective layer of the UE or a subset of layers of the UE.

13. A network node for wireless communication, comprising:
   at least one memory; and
   at least one processor coupled with the at least one memory, the at least one processor configured to cause the network node to:
      receive, from a user equipment (UE), a capability report indicating that the UE supports reporting of a requested bandwidth in accordance with an efficiency associated with the UE;

transmit, to the UE and in accordance with the capability report, an indication to transmit the requested bandwidth;
   receive an indication of a first bandwidth requested to be used for communications of the UE, the first bandwidth being in accordance with on the efficiency associated with the UE and a change to one or channel conditions; and
   transmit an indication that the first bandwidth or a second bandwidth is to be used for the communications of the UE.

14. The network node of claim 13,
wherein the capability report further indicates that the UE supports estimating a power efficiency that is based at least in part on the one or more channel conditions, wherein the efficiency associated with the UE comprises the power efficiency.

15. The network node of claim 13,
wherein the indication of the first bandwidth is included in a connection establishment communication.

16. A method of wireless communication performed by a user equipment (UE), comprising:
   transmitting, to a network node, a capability report indicating that the UE supports reporting of a requested bandwidth in accordance with an efficiency associated with the UE;
   receiving, from the network node and in accordance with the capability report, an indication to transmit the requested bandwidth;
   transmitting, to the network node, an indication of a first bandwidth requested to be used for communications between the UE and the network node, the first bandwidth being in accordance with the efficiency associated with the UE and a change to one or more channel conditions; and
   receiving, from the network node, an indication that the first bandwidth or a second bandwidth is to be used for the communications between the UE and the network node.

17. The method of claim 16,
wherein the efficiency associated with the UE includes at least one of an estimated power efficiency of the UE or a spectral efficiency.

18. The method of claim 16,
wherein the capability report further indicates that the UE supports estimating a power efficiency that is based at least in part on the one or more channel conditions, wherein the efficiency associated with the UE comprises the power efficiency.

19. The method of claim 16, further comprising
communicating, with the network node, one or more signals using the first bandwidth or the second bandwidth.

20. The method of claim 16,
wherein the indication of the first bandwidth includes an indication of multiple bandwidth sizes of the first bandwidth.

21. The method of claim 16,
wherein the indication of the first bandwidth is included in a connection establishment communication.

22. The method of claim 16,
wherein transmitting the indication of the first bandwidth is in accordance with receiving the indication to transmit the requested bandwidth.

23. The method of claim 16,
wherein the first bandwidth is for all layers that are of the UE.

24. The method of claim 16, further comprising:

detecting that the change in the one or more channel conditions comprises a change in a value of at least one channel condition, of the one or more channel conditions, wherein the change satisfies a threshold; and transmitting, to the network node, a third bandwidth requested to be used for the communications between the UE and the network node, wherein the third bandwidth is in accordance with an estimated power efficiency of the UE corresponding to the change in the value of the at least one channel condition, wherein the efficiency associated with the UE comprises the estimated power efficiency of the UE.

25. The method of claim 16, further comprising:

transmitting, to the network node, an indication of a third bandwidth requested to be used for the communications between the UE and the network node in accordance with a change in a power efficiency of the UE, corresponding to the first bandwidth or the second bandwidth, satisfying a threshold, wherein the efficiency of the UE comprises the power efficiency of the UE.

26. The method of claim 16, wherein the indication that the first bandwidth or the second bandwidth is to be used is included in a radio resource control (RRC) communication or a medium access control (MAC) control element (MAC-CE) communication.

27. The method of claim 16, further comprising receiving, from the network node, a downlink data communication and a downlink control channel communication using the first bandwidth or the second bandwidth.

28. A method of wireless communication performed by a network node, comprising:

receiving, from a user equipment (UE), a capability report indicating that the UE supports reporting of a requested bandwidth in accordance with an efficiency associated with the UE;

transmitting, to the UE and in accordance with the capability report, an indication to transmit the requested bandwidth;

receiving an indication of a first bandwidth requested to be used for communications of the UE, the first bandwidth being based in accordance with on the efficiency associated with the UE and a change to one or channel conditions; and transmitting an indication that the first bandwidth or a second bandwidth is to be used for the communications of the UE.

29. The method of claim 28, wherein the capability report further indicates that the UE supports estimating a power efficiency that is based at least in part on the one or more channel conditions.

30. The method of claim 28, further comprising transmitting an indication that the UE is to transmit a requested bandwidth.

* * * * *